United States Patent Office 3,810,913
Patented May 14, 1974

3,810,913
METHOD OF CHLORINATING MALEIC ANHYDRIDE, MALEIMIDES AND BISMALEIMIDES
Howard M. Relles, Rexford, N.Y., assignor to General Electric Company, Schenectady, N.Y.
No Drawing. Filed Feb. 16, 1972, Ser. No. 226,974
Int. Cl. C07d 27/18
U.S. Cl. 260—326.26
8 Claims

ABSTRACT OF THE DISCLOSURE

A method is provided for converting maleic anhydride or aliphatically unsaturated imides derived therefrom, such as N-phenylmaleimide, to the corresponding chlorinated derivatives, based on the replacement of α-carbon hydrogen atoms with chlorine atoms. Chlorination can be achieved by the addition of pyridine to a thionyl chloride solution of the aliphatically unsaturated anhydride or imides. The resulting chlorinated compound can be employed as intermediates for making polymers with dihydric phenols.

The present invention relates to a method of chlorinating maleic anhydride, or aliphatically unsaturated imides, based on the replacement of α-carbon hydrogen atoms with chlorine atoms.

Prior to the present invention, dichloromaleimides and tetrachlorobismaleimides were prepared by the reaction of dichloromaleic anhydride with organic primary monoamines and diamines. The dichloromaleic anhydride was made by chlorinating maleic anhydride with chlorine in the presence of an iron catalyst. The reaction between the dichloromaleic anhydride and the organic amine to make the maleimide or bismaleimide often led to undesirable by-products, such as shown by the following equation:

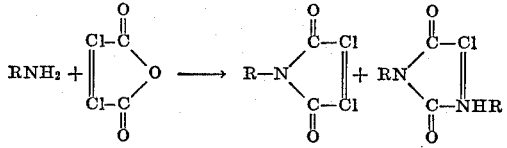

As a result, yields of the desired chlorinated imides or bisimide were often substantially reduced.

As used hereinafter the term "maleimide" will signify monomaleimides and bismaleimides derived from the reaction of maleic anhydride with organic primary monoamines and diamines.

The present invention is based on the discovery that α-carbon hydrogen atoms on maleic anhydride and maleimides derived therefrom, can be readily replaced with chlorine atoms without undesirable side reactions to produce the corresponding polychloro aliphatically unsaturated compounds in high yields. Reaction between maleic anhydride or maleimide derived therefrom can be effected with thionyl chloride in the presence of pyridine.

There is provided by the present invention, a method for chlorinating aliphatically unsaturated compounds, based on the replacement of α-carbon hydrogen atoms with chlorine atoms, which comprises:

(1) effecting reaction between (A) a member selected from maleic anhydride and aliphatically unsaturated maleimides derived therefrom with (B) thionyl chloride, in the presence of (C) pyridine, and
(2) recovering chlorinated derivatives of (A) from the resulting mixture of (1), wherein said mixture of (1) there is employed, per mole of (A), at least 2 moles of (C) and sufficient moles of (B) to provide for the replacement of α-carbon hydrogen atoms of (A) with chlorine atoms of (B).

Included by the aliphatically unsaturated maleimides which can be employed in the practice of the present invention are maleimides of the formula, (1) 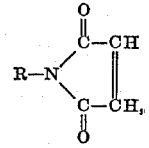

and bismaleimides of the formula, (2) 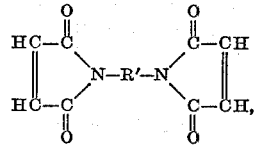

where R is selected from hydrogen and a monovalent hydrocarbon radical, and R' is a divalent organo radical selected from divalent hydrocarbon radicals, and divalent radicals of the formula,

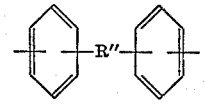

where R'' is selected from $C_{(1-8)}$ alkylene,

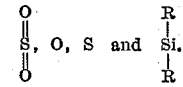

Radicals included by R of formula 1 are more particularly aryl, such as phenyl, tolyl, xylyl, napthyl, etc.; alkyl, such as methyl, ethyl, propyl, butyl, pentyl, hexyl, etc. R' is more particularly alkylene, such as methylene, dimethylene, trimethylene, hexamethylene, etc.; o-phenylene, m-phenylene, p-phenylene, etc.; xylylene, napthylene, anthrylene, etc. Some of the radicals included by R'' in addition to those shown above are for example, methylene, dimethylene, trimethylene, ethylidene, propylidene, etc.

There are included by the maleimides of formula 1, for example, maleimide, N-methyl maleimide, N-ethyl maleimide, and N-phenyl maleimide, N-tolyl maleimide, etc. Bismaleimides included by formula 2, are for example, N,N'-ethylene-bis-maleimide,
N,N'-m-phenylene-bis-maleimide,
N,N'-p-phenylene-bis-maleimide,
N,N'-hexamethylene-bis-maleimide,
N,N'-p,p'-diphenyldimethylsilyl-bis-maleimide,
N,N'-p,p'-diphenylmethane-bis-maleimide (hereafter referred to as "BMI"),
N,N'-p,p'-diphenylether-bis-maleimide,
N,N'-p,p'-diphenylthioether-bis-maleimide,
N,N'-diphenylsulfone-bis-maleimide,
N,N'-dicyclohexylmethane-bis-maleimide,
N,N'-m-xylylene-bis-maleimide,
N,N'-p,p'-benzophenone-bis-maleimide,
N,N'-(3,3'-dichloro-p,p'-biphenylene) bis-maleimide, etc.

In the practice of the method of the present invention, reaction is effected between the "aliphatically unsaturated reactants," which hereinafter will signify maleic anhydride, or maleimide, as previously defined, and thionyl chloride in the presence of pyridine while the resulting mixture of ingredients is stirred. The order of addition of the various reactants in forming the reaction mixture is not critical. Experience has shown that optimum results are achieved, if the aliphatically unsaturated reactant is dissolved in the thionyl chloride and the pyridine is added to the resulting solution. Thionyl chloride also can be used in less than solvent amounts, provided quantities are employed which are at least sufficient to replace α-carbon hydrogen atoms of the aliphatically unsaturated reactant with chlorine atoms. If desired, excess unreacted thionyl chloride can be recovered by stripping the mixture under reduced pressure. Pyridine is employed in amounts of at least 2 moles of pyridine, per mole of aliphatic unsaturated reactant. The pyridine is recovered as pyridine hydrochloride and can be reused after neutralization and drying.

Reaction can be achieved at ambient conditions if desired, or the reactants can be refluxed to facilitate the formation of the desired polychlorinated maleic anhydride or maleimide reaction product. Reaction times of as little as 5 minutes or less to 1 hour or more will not be unusual, depending upon such factors as degree of agitation, the ingredients employed, conditions used, proportions of the reactants, etc.

The polychlorinated maleimide made by the method of the present invention can be employed as intermediates for making polymers by reaction with dihydric phenols, as taught for example, in copending application Ser. No. 226,978, filed concurrently herewith. In addition, the dichloromaleimide reaction products can be employed as herbicides, etc.

In order that those skilled in the art will be able to practice the invention, the following examples are given by way of illustration and not by way of limitation. All parts are by weight.

EXAMPLE 1

There was added 16.22 parts of pyridine over a period of 12 minutes to a solution of 9.81 parts of maleic anhydride in 167 parts of thionyl chloride, while the solution was stirred in an ice bath in dry air. The resulting mixture was then heated briefly at 75° C. and then cooled. Excess thionyl chloride was then removed under reduced pressure. There was obtained a solid residue which was triturated with benzene and filtered. Upon removal of solvent from the benzene filtrate there was obtained 16.48 parts of crude product. The product was then sublimed and extracted with hexane to give an 80% yield of pure dichloro maleic anhydride having a melting point of 118–120° C. Its identity was confirmed by mass spectrometry.

EXAMPLE 2

There was added 1.66 parts of pyridine to a solution of 1.73 parts of N-phenylmaleimide in about 34 parts of thionyl chloride, while the resulting mixture was stirred in a cold water bath. Stirring was continued for 15 minutes at a temperature of about 20° C., then the mixture was refluxed for 1 hour. All of the excess thionyl chloride was removed under reduced pressure and the residue was combined with about 150 parts of chloroform. The chloroform solution was then extracted with dilute hydrochloric acid to effect the removal of pyridine hydrochloride. It was then dried, filtered and stripped of solvent. There was obtained 2.78 parts of a solid residue. The crude product was then recrystallized from chloroform to give 1.85 parts of N-phenyldichloromaleimide, which represented a 76% yield. The melting point of the product was 204–205° C., and its identity was confirmed by its infrared and mass spectra.

EXAMPLE 3

There was added 1.66 parts of pyridine to a solution of 1.11 parts of N-methyl maleimide in about 33 parts of thionyl chloride. The resulting mixture was stirred at room temperature for about 1 hour and then refluxed for about 1 hour. There was obtained a yield of .79 part of crude product after the excess thionyl chloride was stripped from the mixture and the resulting residue was triturated with 50% aqueous ethanol. Upon recrystallization of the crude product from a 50% aqueous ethanol solution, there was obtained a 20% yield of N-methyl maleimide having a melting point of 81.5–82.5° C. Its identity was confirmed by its infrared, N.M.R. and mass spectra.

EXAMPLE 4

There was added 3.24 parts of pyridine to a solution of 1.94 parts of maleimide dissolved in about 65 parts of thionyl chloride, while the resulting mixture was stirred in a cold water bath. Stirring was continued at about 20° C. for 15 minutes and then the mixture was refluxed for 1 hour. The excess thionyl chloride was then stripped from the mixture under reduced pressure and the crude product was recrystallized from chloroform. There was obtained a 25% yield of dichloromaleimide having a melting point of 174–175.5° C. Its identity was confirmed by its infrared and mass spectra.

EXAMPLE 5

There was added 1.66 parts of pyridine to a solution of 1.34 parts of m-phenylene diamine-bis-maleimide dissolved in about 34 parts of thionyl chloride, while the resulting mixture was stirred in a cold water bath. The mixture was stirred at a temperature between 20–25° C. for 1 hour and then refluxed for 1 hour. Excess thionyl chloride was then stripped from the mixture and the resulting crude product was recrystallized from a benzene/cyclohexane mixture. There was obtained a 50% yield of m-phenylene diamine-bis-dichloromaleimide having a melting point of 172.5–174° C. Its identity was confirmed by its infrared and mass spectra.

EXAMPLE 6

There was added 1.66 parts of pyridine to a solution of 1.79 parts of methylene dianiline-bis-maleimide dissolved in about 35 parts of thionyl chloride, while the resulting mixture was stirred in a cold water bath. Stirring of the mixture was continued at 25° C. for 16 hours, and then the mixture was refluxed for 1 hour and cooled. After excess thionyl chloride was stripped from the mixture under reduced pressure, the crude residue was triturated with methanol, and then recrystallized from a chloroform methanol mixture. There was obtained a 65% yield of methylene dianiline-bis-dichloromaleimide having a melting point of 225–226° C. Its identity was confirmed by its infrared, N.M.R. and mass spectra.

EXAMPLE 7

There was added 0.83 part of pyridine to a solution of 0.835 part of oxydianiline-bis-maleimide dissolved in about 16.7 parts of thionyl chloride while the mixture was stirred in a cold water bath. After the resulting mixture had been stirred for 1 hour at a temperature of 20–25° C. it was refluxed for 1 hour and then cooled. The excess thionyl chloride was then stripped under reduced pressure and the solid residue was purified by a methanol trituration and a subsequent chloroform/methanol recrystallization. There was obtained a 60% yield of oxydianiline-bis-dichloromaleimide having a melting point of 260–261.5° C. Its identity was confirmed by its infrared and mass spectra.

What I claim as new and desire to secure by Letters Patent of the United States is:

1. A method for replacing α-carbon hydrogen atoms with chlorine atoms, which comprises:
(1) effecting reaction at ambient temperatures to reflux temperatures between (A) maleic anhydride or an aliphatically unsaturated imide selected from the class consisting of a maleimide of the formula

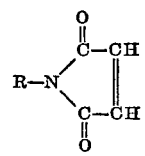

and a bismaleimide of the formula,

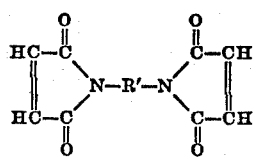

with (B) thionyl chloride in the presence of (C) pyridine, (2) recovering dichlorinated derivatives of (A) from the resulting mixture of (1), wherein said mixture of (1) there is employed per mole of (A) at least 2 moles of (C) and sufficient moles of (B) to provide for the replacement of α-carbon hydrogen atoms of (A) with chlorine atoms of (B), where R is a monovalent radical selected from the class consisting of hydrogen, phenyl, tolyl, xylyl, and naphthyl, methyl, ethyl, propyl, butyl, pentyl and hexyl, and R' is a divalent hydrocarbon radical, selected from the class consisting of methylene, dimethylene, trimethylene, hexamethylene, o-phenylene, m-phenylene, p-phenylene, xylylene, naphthylene and anthrylene, and divalent radicals of the formula

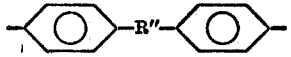

where R'' is selected from the class consisting of $C_{(1-8)}$ alkylene,

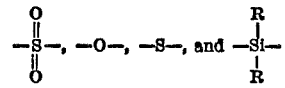

2. A method in accordance with claim 1, wherein the α-carbon hydrogen atoms of maleic anhydride are replaced with chlorine atoms.

3. A method in accordance with claim 1, where the aliphatically unsaturated imide is maleimide.

4. A method in accordance with claim 1, where the aliphatically unsaturated imide is N-methylmaleimide.

5. A method in accordance with claim 1, where the aliphatically unsaturated imide is N-phenylmaleimide.

6. A method in accordance with claim 1, where the aliphatically unsaturated imide is m-phenylene-bis-maleimide.

7. A method in accordance with claim 1, where the aliphatically unsaturated imide is methylene dianiline-bis-maleimide.

8. A method in accordance with claim 1, where the aliphatically unsaturated imide is oxydianiline bis-maleimide.

References Cited

McDonald et al., J. Org. Chem., vol. 28, 2542–44 (1963).

JOSEPH A. NARCAVAGE, Primary Examiner

U.S. Cl. X.R.

71—95; 260—326.5 FM, 326.44, 346.8 R